United States Patent Office 3,429,868
Patented Feb. 25, 1969

3,429,868
METHOD OF PREPARING A SERIES OF PROSTHETIC GROUPS AND COENZYMES OF A NEW REDOX-ENZYME WHICH ARE PRESENT IN PLANTS, ANIMALS, OR FOODS AND HAVE VITAMIN-LIKE ACTIVITY
Kiyoshi Kominato, No. 15 Shimogamo-Hagigakakiuchicho, Sakyoku, Kyoto, Japan
No Drawing. Continuation of application Ser. No. 410,307, Nov. 10, 1964. This application Nov. 4, 1966, Ser. No. 592,231
Claims priority, application Japan, Mar. 12, 1956, 31/6,218
U.S. Cl. 260—112.5          3 Claims
Int. Cl. A01k *19/02;* C07g *7/02*

ABSTRACT OF THE DISCLOSURE

The disclosed compounds are of the class of coenzymes having a 3-creatinyl-4-methyl-5β-oxyethylthiazol as its central nucleus, such as Scordinin B, useful as growth-promoting and metabolically active agents.

---

The present invention relates to a method for preparing a series of new coenzymes and more particularly to a method for preparing coenzymes wherein the 3-creatinyl-4-methyl-5β-oxyethyl-thiazol group is the central component.

This application is a continuation of Ser. No. 410,307, filed Nov. 10, 1964, now abandoned, which in turn is a continuation-in-part of Ser. No. 634,145, filed Jan. 15, 1957, and now abandoned.

These compounds are more fully described by the following general formula:

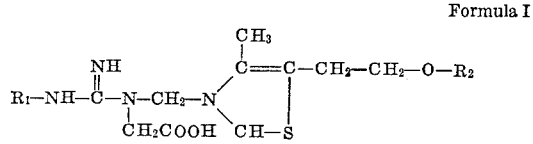

Formula I wherein $R_1$ may include radicals consisting of peptides, polypeptides, amino acids, and S-glycosides of allylmercaptans and wherein $R_2$ may include radicals consisting of nucleic acids and their derivatives such as ribonucleotides of nicotinamide, purine bodies such as adenine and guanine, and pyrimidine bases such as uracil, thymine and cytosine.

The 3-creatinyl-4-methyl-5β-oxyethyl-thiazole group, hereinafter referred to simply as the thiamamidine nucleus, is the central component of the new compounds of the present invention and $R_1$ and $R_2$ as hereinabove defined may be the side components respectively.

In accordance with the process of the present invention, thiamamidine, which may be synthesized, for instance, from creatine and thiazole compounds, is matured in a solution under optimum pH conditions together with compounds of the type hereinabove defined by $R_1$ and $R_2$ respectively, which may be obtained from plant and animal materials as well as with enzymes and the said coenzymes are then extracted from the matured solutions. The compounds of the present invention may then be recovered in crystalline form.

The coenzymes of the present invention have important properties rendering them useful as growth-promoting and metabolically active agents. In addition, these matured products are useful as additives because of their desirable characteristic flavors.

The above described coenzymes have been isolated in pure crystalline form (M.P. 118° C.) from substances such as garlic.

The following structural formula represents a typical coenzyme of the present invention which will hereinafter be referred to as Scordinin B:

This formula appears separately on page 3 of this specification.

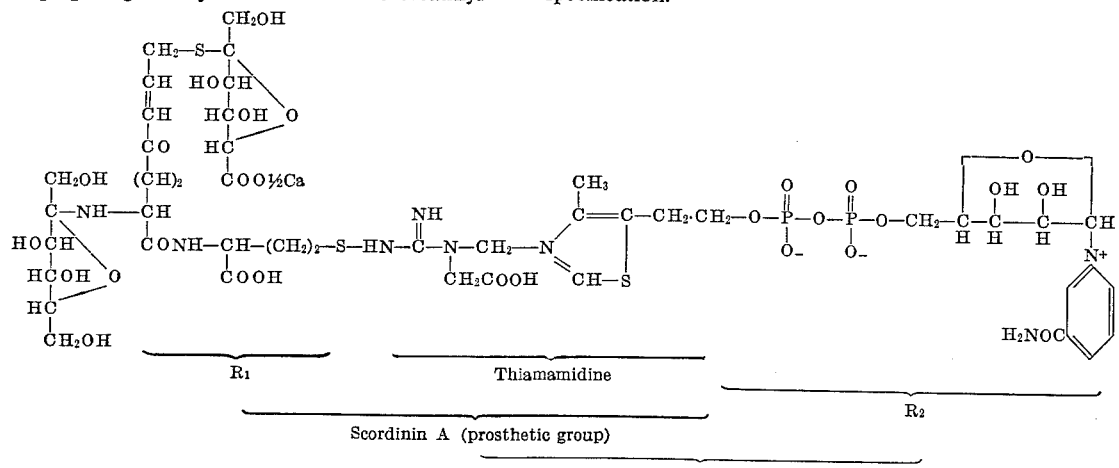

Scordinin B (co-enzyme)

It is seen that Scordinin B represents a mononucleotide of Scordinin A. Scordinin A encompasses that portion of the Scordinin B coenzyme which is shown within the Scordinin A bracked portion of Formula II.

Scordinin B is an example of one of the coenzymes of the present invention which exhibits not only properties similar to those of vitamin $B_1$ but also growth-promoting effects of as much as 10 to 15% when tested in normally fed rats. Additionally, these coenzymes produce metabolic or weight-increasing activity in the human body. Inasmuch as Scordinin B possesses such vitamin-like activity it is quite possible that this coenzyme is in fact a new vitamin.

It has been postulated that substances with thiamamidine in their structures may be present widely in plants or animals having the properties of a coenzyme have important actions on growth. Therefore a series of prosthetic groups and coenzymes has been investigated widely in plants and in animals and isolated as crystals from a number of materials. Thus, from garlic, onion, Japanese onion, eel, Shiitake (Cortinelus), capsicum, beer yeast, honey, rice-embryo-bud, milk, liver, meat, tea and laver, a series of coenzymes has been isolated. Also from brewed substances such as Shoyu (soy) the prosthetic groups have been obtained and from the nonsaponified substances of fats and oils, $R_1$ substances containing fatty acids in their structure have been obtained respectively.

This series of coenzymes obtained from various materials probably relates to a new vitamin. The following experimental results in connection with garlic are set forth as evidence that the thiamidine derivatives obtained from plant and animal materials are a kind of coenzymes.

The physical and chemical properties of the coenzymes of the present invention are as follows: They are soluble in water having acidic reaction, slightly soluble in other organic solvents, and melt at lower temperatures (about 100° C.) For example, Scordinin B melts at 118°. They are negative in Preburda's diazo-test for vitamin $B_1$, but are positive in this test after hydrolysis with diastase or hydrolysis by warming with $Ba(OH)_2$ or $Ca(OH)_2$. This suggests the presence of ester in the position of 5-oxyethyl of the thiazol group in the structures of coenzymes. Phosphates in diastase may attack the ester bond with phosphoric acid as has already been shown in cocarboxylase. They are also positive in Jaffe's reaction and are negative in Weyl's reaction. They show orange-red or red color clearly with sodium nitroprusside in alkaline solution after the treatment with boiling 15% HCl for a while and then with alkali to neutralize. Though this color fades presently, they also show green color or Prussian-blue successively when kept in acidic state with acetic acid. It is suggested from Jaffe's and modified Weyl's reactions that creatin is present in their structures and that the guanidin-group in creatin is substituted with other components on the amino groups. As one of the distinctive properties, the amino group of the amino acid in their structures forms N-glycoside linkages with sugars, showing positive reaction for ninhydrin reaction or reducing power for Fehling's solution only after their hydrolysis with dilute mineral acids. N-glycoside linkages in their structure generally seem to be active components in the process of metabolism in a living body. The coenzyme from eel is positive for ninhydrin reaction, and the coenzymes from eel or milk show positive Biuret reaction indicating the presence of free amino groups and peptide linkages consisting of more than three amino acids in their structure respectively. Thus, these components with the characteristic taste or flavor of foods are formed by the combination of thiamamidines with various $R_1$ components. This important fact was discovered in accordance with the present invention. For example, the coenzyme isolated from Japaneses rice embryo (named as oryzamidine) gives a taste characteristic of Japanese rice to a different substance when cooked with a small amount of the coenzyme, and also makes a synthesized Sake (Japanese drink) into a brewed one. The coenzyme from milk (named as lactamidine) also has a taste characteristic of milk, and that from Shiitake (Cortinellus) is a glycoside and reveals its special flavor after hydrolysis with glycosidase. This is the reason why no characteristic flavor is found in a fresh Shiitake. The above explanations show that these coenzymes or prosthetic groups are closely connected to the sources of both the nutrients and flavors characteristic of the various plant and animal materials. It is a significant fact that the constituent of the flavor characteristic of foods is a valuable nutritive component as well.

The special properties of coenzymes closely connected with their physiological activities are given in the following description. For example, the properties of coenzyme from garlic and Scordinin B are discussed. Scordinin B, in its weak alkaline solution, converts easily methylene blue into its leuco form at about 38° C., which however is also restored to its original state with $O_2$ or air in the solution. Scordinin B gives a reddish violet color with Sakaguchi's reagent indicating the presence of the guanidin group in its structure. This color fades presently and is also restored to the original state by introducing air into the solution. These properties of Scordinin B with respect to the oxidizing or reducing reagents are caused by the presence of both the imino group and sulfhydryl group in the thiamamidin nucleus. That is, the allylmercaptyl group in the structure of Scordinin B is liable to lose a proton $H^+$ because of the influence of both the carbonyl group and double bond adjoining the sulfhydryl group

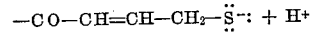

The loose proton $H^+$ is carried to the acceptor in the form of hydronium-ion $H_3O^+$ with $H_2O$. Also, the guanidin group in the structure is liable to coordinate with a proton by forming

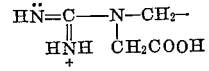

with the effect that the $=NH$ group acts as a nucleopholic one. Therefore, a redox potential is formed between

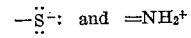

in the structure. The thiazol group,

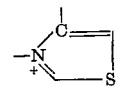

niacinamide group,

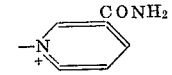

and pyrophosphate,

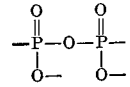

also form the redox-potentials in a molecule of Scordinin B. The characteristic properties and high physiological activities of Scordinin B are due to these redox-potentials in the structure.

The coenzymes of the present invention may be prepared in accordance with the following methods:

(I) Synthesis of thiamamidine (1) Thiamamidine, 3-creatinyl-4-methyl-5β-oxyethyl-thiazol is synthesized by condensing halogencreatin prepared from creatin with halogen and 4-methyl-5β-oxyethylthiazol in glacial acetic acid according to the following reaction:

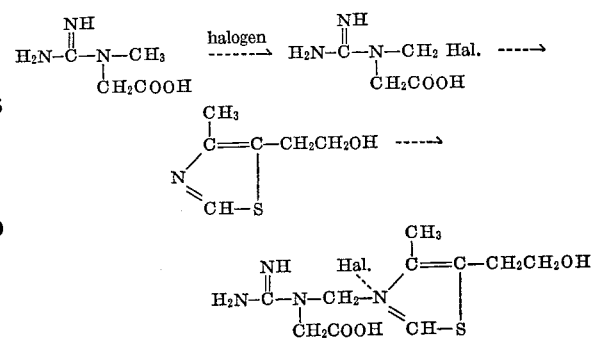

(2) Thiamamidine is prepared by treating creatin ethyl ester in glacial acetic acid with 1.5–2.0 mols of bromine added drop by drop in the presence of a little amount of red phosphor as a catalyst and then treating successively with 4-methyl-5β-oxyethyl thiazol.

(3) At the start, creatin-ethyl-ester bromide is prepared from creatin-ethyl-ester by treating with bromine in glacial acetic acid. Thioformamido-creatin-ethylester is then prepared from the bromide with thioformamide. 3-creatinyl-4-methyl-5β-oxyethyl thiazol (thiamamidine) is obtained by condensing thioformamaido-creatin-ethylester with γ-aceto-γ-chloropropyl-alcohol.

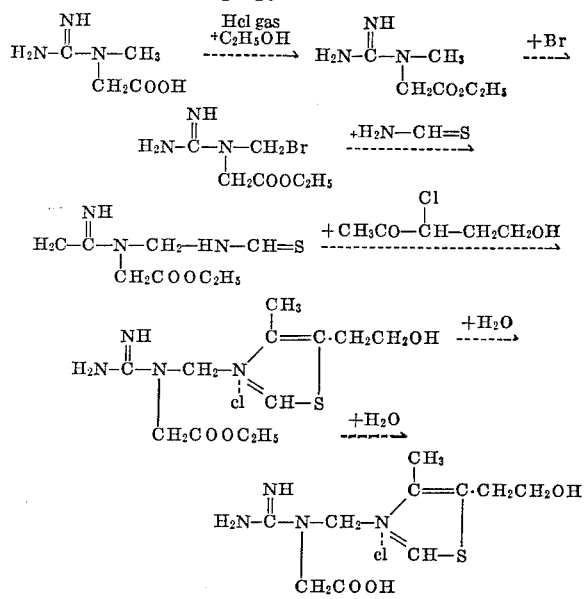

(II) Sources of $R_1$ and $R_2$

The $R_1$ and $R_2$ groups of the coenzymes are not obtained by synthesis not only because their structures vary with their sources, but also because their structures are too complicated to be synthesized economically. If $R_1$ is a simple component such as peptide, it may be synthesized by the following processes:

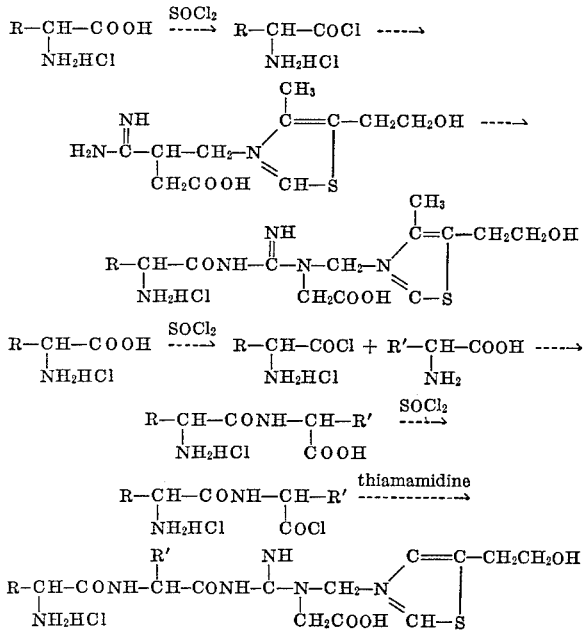

Polypeptides may be synthesized by the general methods such as the E. Fischer, Schönheim, and Bergman methods. If the structure of $R_1$ is more complex that that of tripeptide, the synthesis of $R_1$ is so difficult to complete in practice that it is obliged to be carried out by the biosynthetic processes with enzymes, yeast, fungi, etc. Therefore, it is more profitable in practice to prepare the coenzymes by the combined method of synthesis and biosynthesis.

The solution containing the substrate abundantly stored with $R_1$ and $R_2$ materials is extracted from the plant or animal materials and sometimes is enriched by adding amino acids, sugars, or other raw materials. In the case of Scordinin B, for example, glutamyl-homocystein, allylthioglucoside, fructose, niacinamide, ribonucleotides, cozymase I, or bear yeast are added to the extracts from garlic for enrichment of concentration of $R_1$ and $R_2$. The coenzymes have been biosynthesized in maturing solutions which consisted of synthesized thiamamidine, and the substrate by the action of enzyme which was extracted from the same materials as those of the substrates.

(III) The method of the maturation

The words "maturing solution" employed in the present specification means the solution being kept under a suitable pH and an optimum temperature, and in which the substrate is contained with the enzyme. The substrate consists of prosthetic groups, other starting materials, and thiamamidine.

The raw material is pressed or extracted with hot water after inactivating the enzymes by general conventional methods. After removing protein with ferric hydroxide and the precipitates with lead acetate from the extract, the filtrate is treated with activated charcoal. The prosthetic group or the related compounds are adsorbed by the activated charcoal. They are eluted with 80% methanol and then distilled from the methanol under pressure at low temperature. The residue is dissolved in water and used as the substrate. Sometimes the substrate solution is enriched by adding the components of a prosthetic group, such as amino acids or niacinamide.

The enzyme preparation is obtained from the same material as that of the substrate by the following process: (1) Extraction with 1–2% NaCl solution; (2) precipitation of enzyme by adding a mixture of equal volume of ethanol and ether to the extract; (3) drying the precipitate at low temperature under reduced pressure. The enzyme preparation is stable for 1–2 years, when stored as a powder or glycerin solution in a cold place.

These three components, the substrate, the enzyme, and thiamamidine are matured in a water solution at 15–16° C. for 1–2 weeks under an optimum pH (in the case of garlic, pH 5.8–6.0).

(IV) The extraction of coenzyme from the matured solution

The coenzyme is precipitated with lead acetate from the matured solution. The precipitate is washed with 5% lead acetate several times, and suspended in water. The coenzyme is then adsorbed with anion exchange resin such as Amberite I.R.A. 400 after removing lead with $H_2S$. The elution of the coenzyme is carried out with $N-Na_2CO_3$. The free coenzyme solution is obtained after treating the eluted solution with cation exchange resin such as Amberite I.R. 120 and is condensed at low temperature under reduced pressure and then placed in an ice box. The coenzyme is obtained in a fine plate crystal. The melting point of the coenzyme is usually lower than that of the prosthetic group, for example, Scordinin B melts at 117–118° C. Scordinin A melts at 230°–231° C. Another method for the preparation of the coenzyme differs from the above method in the following technique: charcoal is used as the adsorbent in place of the ion exchange resin, and the prosthetic group is recovered by adsorption with charcoal from the mother liquor after removal of the precipitate formed with lead acetate.

The present invention is illustrated by but is not to be limited to the following examples.

EXAMPLE 1

Synthesis of thiamamidine nucleus

Creatin (100 g.) was dissolved in glacial acetic acid (500 cc.) at 35°–40° C., and the solution was treated with bromine (90 g.) by adding little by little at 30°–40° C. The discharge of red color was apparent with the proceeding of reaction. After adding ⅔ volume of bromine the reaction was continued at a little higher temperature with violently stirring. About 5–6 hours are required for the addition of ⅔ volume of bromine, and 8–10 hours for the addition of the total volume.

Creatin bromide was obtained in crystalline form after keeping the reaction mixture in an ice box for a week. M.P.: 129°–130° C. Yield: 165 g. (80% of theory). Creatin bromide was treated with 3 mol. (about 350 g.) of 4-methyl-5β-oxyethyl-thiazol in a mixed solution (500 cc.) of equal volumes of absolute ethanol and absolute butanol at 45° C. by adding the reagent little by little for 3–4 hours and then the solution was kept at 50°–60° C. for a while. Thiamamidine was crystallized from the solution after keeping it in an ice box for 1–2 weeks. Yield: 210 g. (68% of theory).

EXAMPLE 2

Creatin (100 g.) was dissolved in glacial acetic acid (500 cc.) and treated with bromine (100 g.) by adding little by little at low temperature for more than 5 hours in the presence of pure red phosphor (2 g.) (more than 10 g. of red phosphor are added for the synthesis of pyrophosphorester of thiamamidine), and succesively was treated with 3–2.5 mol (200–280 g.) of 4-methyl-5β-oxyethyl-thiazol by adding drop by drop over a long period of time at a low temperature. The reaction mixture was kept at 50–60° C. for a short time and then left in an ice box. Thiamamidine was obtained in plate crystals. Yield: 230 g.

EXAMPLE 3

Ethylformate was synthesized from calcium formate with absolute ethanol by a conventional general method. Formamide was obtained by treating ethyl formate with ammoniac (S.G. 0.9). Thioformamide was synthesized by treating formamide with $P_2S_5$. Thioformamide is very unstable and decomposed at higher than 60° C., therefore is stored in ether. Creatin-ethylester was prepared by a conventional general method and then brominated by the method of Example 1. The bromide of creatin-ethylester (10 g.) in a mixed solution (100 cc.) of equal volume of absolute alcohol and absolute butanol was condensed by adding thioformamide (10 g.) drop by drop at lower than 30° C. in an ice water bath. Creatin-thioformamide-ethylbromide is contained in the resulting solution. On the other hand α-acetobutyrolactone was synthesized from ethylen oxide and sodium acetoacetic-acid-ethylester (prepared from aceto-acetic acid by esterifying and by treating with metallic Na) and was converted to chlorolactone with $SOCl_2$. γ-Choloro-γ-aceto-propylalcohol was obtained by the hydrolysis of the lactone. γ-Chloro-γ-aceto-propylalcohol (38 g.) in absolute alcohol (50 cc.) was added little by little within 1–2.5 hours at lower than 60° C. to the above solution of creatin-thioformamide-ethylbromide in ethanol-butanol. Thiamamidine was obtained in crystalline form after removing the solvent from the reaction mixture at 40°–45° C. under reduced pressure (10 mm. Hg). Yield: 50%.

EXAMPLE 4

Biosynthesis of the coenzyme is accomplished by maturing the mixed solution of the substrate, thiamamidine, and the enzyme, wherein garlic (10 kg.) was used as the source material for substrate and enzyme. The resultant product was treated by a conventional general method to inactivate the enzyme. Scordinin A and the analogous components such as peptides, glutamylhomocystein, or allylthioglucoside and the like were condensed by adsorbing with charcoal (200 g.) after a preliminary treatment for removing water soluble protein with colloidal ferric hydroxide. Scordinin A and the aforesaid analogous components were eluted from the charcoal with methanol and were obtained in a concentrate solution (62.5 g.) by distilling off the methanol. The solution which was abundant in Scorinin A was matured at 30° C. for 15 days at pH 5.6, in the presence of toluol, with thiamamidine (15 g.), sodium hydrogen phosphate (10 g.), niacinamide (7 g.), ribose (5 g.), and also with enzyme solution (100 cc.: 0.01% glycerine solution) which was prepared from garlic according to the following method:

The garlic juice was obtained by pressing the pared material (500 g.) and was filtered through a hempen cloth after adding NaCl of 1–2% concentration. From the filtrate a precipitate was produced by adding thereto a mixed solution of alcohol and ether (4:1) and the precipitate was dialyzed in the tap water for 12 hours. The nondialysable fraction was precipitated again by adding a large amount of alcohol-ether solution. This precipitate was dried at low temperature under reduced pressure. Yield: 60 g. This powder was dissolved in glycerine to form a 0.01% solution which is stable upon being stored for a long time.

At the end of the maturing process the solution was once filtered and treated with 10% lead acetate, producing a large amount of precipitate containing coenzyme and the aforesaid analogous components. The precipitate was washed with 1% lead acetate several times and then suspended in water. The lead-free coenzyme was obtained in water solution (125 cc.) after treatment of the precipitate with $H_2S$. This solution is strongly acidic. The adsorption of the coenzyme (Scordinin B) with charcoal (50 g.) in the solution which was diluted with 3 times the amount of water was carried out and this was followed by the elution of the coenzyme from the charcoal with methanol. The syrup (75 g.) abundantly rich in the coenzyme was obtained by condensing the extract and this syrup was further treated with ion exchange resin. The syrup was diluted to 300 cc. Scordinin B was adsorbed with 200 cc. Amberite I.R.A. 400 and then eluted as the sodium salt with N-$Na_2CO_3$. The free Scordinin B in water solution was obtained by treating the salt with Amberite I.R. 120. The solution was condensed to the syrup at lower than 50° C. under reduced pressure and kept in an ice box for a day. Scordinin B is obtained in rhombic crystal form. (M.P. 117°–118° C. yield: 47.5 g.)

While I have shown and described what I believe to be the best embodiments of my invention, it will be apparent to those skilled in the art that various changes and modifications may be made therein without departing from the spirit and scope of the invention as defined in the appended claims.

I claim:

1. A compound selected from the group consisting of:

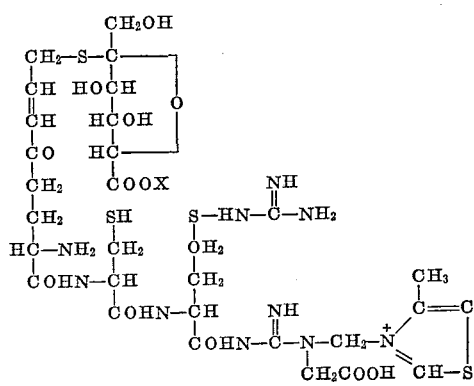
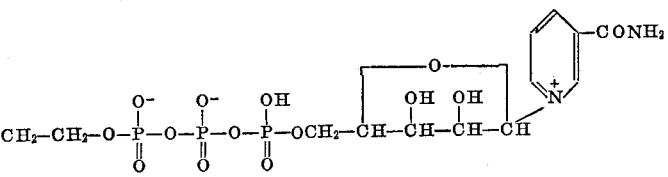

and
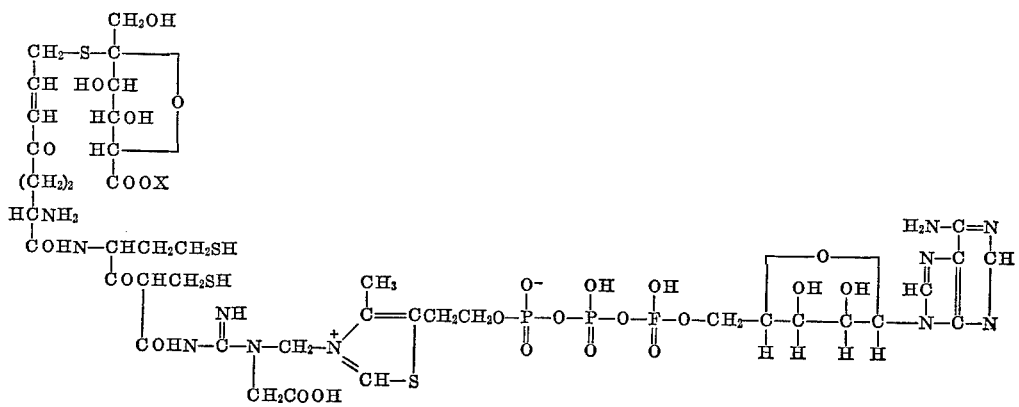
wherein X is selected from the group consisting of hydrogen, calcium and sodium.
2. A compound according to claim 1, wherein X is calcium.
3. A compound according to claim 1, that is Scordinine B.
References Cited
UNITED STATES PATENTS
2,917,434  12/1959  Robilliart _____ 260—211.5
LEWIS GOTTS, *Primary Examiner.*
J. R. BROWN, *Assistant Examiner.*
U.S. Cl. X.R.
260—112, 110, 211.5, 302, 482, 534, 544; 99—140; 424—94